(12) United States Patent
Morishima

(10) Patent No.: US 9,957,877 B2
(45) Date of Patent: May 1, 2018

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Akinori Morishima, Naka-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 31 days.

(21) Appl. No.: 15/277,075

(22) Filed: Sep. 27, 2016

(65) Prior Publication Data

US 2017/0152790 A1    Jun. 1, 2017

(30) Foreign Application Priority Data

Nov. 26, 2015    (JP) ................................. 2015-231116

(51) Int. Cl.

| | |
|---|---|
| *F01P 7/16* | (2006.01) |
| *F01P 3/20* | (2006.01) |
| *F01P 5/12* | (2006.01) |
| *F02M 35/10* | (2006.01) |
| *F02B 29/04* | (2006.01) |

(52) U.S. Cl.
CPC ................ *F01P 7/164* (2013.01); *F01P 3/20* (2013.01); *F01P 5/12* (2013.01); *F02B 29/0437* (2013.01); *F02B 29/0443* (2013.01); *F02B 29/0493* (2013.01); *F02M 35/10268* (2013.01); *F01P 2005/125* (2013.01); *F01P 2025/42* (2013.01); *Y02T 10/146* (2013.01)

(58) Field of Classification Search
CPC .......... F01P 2060/02; F01P 3/12; F01P 7/167; F02D 41/0007; F02D 41/3082; F02D 41/26; F02D 23/00
See application file for complete search history.

(56) References Cited

U.S. PATENT DOCUMENTS

| | | | |
|---|---|---|---|
| 9,255,508 B2 * | 2/2016 | Yacoub | .................. F01N 3/106 |
| 2004/0084030 A1 | 5/2004 | Matsunaga et al. | |
| 2009/0050082 A1 * | 2/2009 | Iwasaki | .................. F04D 13/06 |
| | | | 123/41.49 |

(Continued)

FOREIGN PATENT DOCUMENTS

| | | |
|---|---|---|
| EP | 2 375 035 A1 | 10/2011 |
| EP | 2 415 996 A1 | 2/2012 |

(Continued)

*Primary Examiner* — Long T Tran
(74) *Attorney, Agent, or Firm* — Finnegan, Henderson, Farabow, Garrett & Dunner, LLP

(57) ABSTRACT

A control apparatus for an internal combustion engine that includes an intercooler and an electrically driven water pump configured to circulate cooling water so as to flow through the intercooler is configured to calculate a required intercooler cooling efficiency ηreq obtained by dividing a difference between a cooler inflow gas temperature Tgin and a cooler outflow gas temperature Tgout by a difference between the cooler inflow gas temperature Tgin and a cooling water temperature Tw. A required circulation flow rate Qwreq is calculated based on the required intercooler cooling efficiency ηreq and a cooler passing-through gas flow rate G. The electrically driven water pump is driven so that a cooling water flow rate Qw approaches the required intercooler cooling efficiency ηreq.

5 Claims, 7 Drawing Sheets

(56) References Cited

U.S. PATENT DOCUMENTS

2015/0369179 A1\* 12/2015 Hotta .................. F02D 41/0007
123/568.12

FOREIGN PATENT DOCUMENTS

| JP | 2004-084615 A | 3/2004 |
|----|---------------|--------|
| JP | 2004-156457 A | 6/2004 |
| JP | 2004-211560 A | 7/2004 |
| JP | 2009-235909 A | 10/2009 |
| JP | 2010-190050   | 9/2010 |
| JP | 2011-214544   | 10/2011 |
| JP | 2014-95339    | 5/2014 |
| JP | 2014-156804 A | 8/2014 |
| JP | 2014-218938   | 11/2014 |
| WO | WO2011-036794 A | 3/2011 |

\* cited by examiner

CONTROL APPARATUS FOR INTERNAL COMBUSTION ENGINE

CROSS-REFERENCE TO RELATED APPLICATION

This application is based on and claims the benefit of Japanese Patent Application No. 2015-231116, filed on Nov. 26, 2015, which is incorporated by reference herein in its entirety.

BACKGROUND

Technical Field

The present disclosure relates to a control apparatus for an internal combustion engine, and more particularly to a control apparatus for an internal combustion engine that is suitable as an apparatus for controlling an internal combustion engine that includes a water-cooled intercooler.

Background Art

JP 2011-214544A discloses an intake air temperature control device for an internal combustion engine that includes a water-cooled intercooler and an electrically driven water pump that circulates cooling water so as to flow through the intercooler. This control device calculates, based on engine load and engine speed, a base flow rate that is a command value of a base circulation flow rate for the electrically driven water pump. More specifically, in order to properly adjust the amount of heat that is transferred per unit time from intake air in the intercooler, the base flow rate is set so as to be greater as the engine load and the engine speed are higher.

In addition to JP 2011-214544A, JP 2014-095339A, JP 2014-218938A and JP 2010-190050A are patent documents which may be related to the present disclosure.

SUMMARY

In an internal combustion engine that includes a water-cooled intercooler and an electrically driven water pump that circulates cooling water so as to flow through the intercooler, it is conceivable to adopt a configuration in which a required circulation flow rate of the cooling water is determined and the electrically driven water pump is driven so as to cause a circulation flow rate to approach a determined required circulation flow rate, in order to cause the temperature of a cooler outflow gas that flows out from the intercooler to approach a target temperature. In this configuration, in order to properly determine the required circulation flow rate based on the operational state of the internal combustion engine (for example, the engine load and engine speed as disclosed in JP 2011-214544A), it is required to include, taking into consideration the state of the outside air (such as temperature and pressure of the outside air), a relation information that defines a relation between the required circulation flow rate, and the engine load and engine speed. This is because, if the state of the outside air varies, the aforementioned target temperature, a cooling water temperature, the temperature of cooler inflow gas that flows into the intercooler, and the flow rate of the gas that passes through the intercooler vary. More specifically, where the relation information is, for example, a map, it is required to include a plurality of maps in accordance with the target temperature, for example. As a result, there is a concern that a lot of man hour for creating the aforementioned relation information may be required.

The present disclosure has been made to address the above described problem, and an object of the present disclosure is to provide a control apparatus for an internal combustion engine that, in a configuration in which an electrically driven water pump is driven with a required circulation flow rate for causing the temperature of outflow gas from a water-cooled intercooler to approach a target temperature, can properly calculate the required circulation flow rate based on a relation information while reducing man hour for creating the relation information.

A control apparatus for controlling an internal combustion engine according to the present disclosure is configured to control an internal combustion engine that includes: a cooling water flow circuit through which cooling water for cooling an intake gas of the internal combustion engine flows; an intercooler arranged in the cooling water flow circuit and configured to conduct heat exchange between the intake gas and the cooling water; and an electrically driven water pump arranged in the cooling water flow circuit and configured to circulate the cooling water so as to flow through the intercooler. The control apparatus includes a controller. The controller is programmed to: detect or estimate a cooler inflow gas temperature Tgin that is a temperature of the intake gas that flows into the intercooler; detect or estimate a cooling water temperature Tw of the cooling water; detect or estimate a cooler passing-through gas flow rate that is a flow rate of the intake gas that passes through the intercooler; and calculate a required intercooler cooling efficiency ηreq that is defined by a following formula (i):

$$\eta req = \frac{Tgin - Tgouttrg}{Tgin - Tw} \quad (i)$$

In the formula (i), Tgouttrg denotes a target temperature of a cooler outflow gas temperature that is a temperature of the intake gas that flows out from the intercooler. The controller is further programmed to: calculate, with a relation information that defines a relation between the required intercooler cooling efficiency ηreq, the cooler passing-through gas flow rate, and a required circulation flow rate of the cooling water required to cause the cooler outflow gas temperature to approach the target temperature Tgouttrg, the required circulation flow rate based on the required intercooler cooling efficiency ηreq and the cooler passing-through gas flow rate; and drive the electrically driven water pump so that a circulation flow rate of the cooling water approaches the required circulation flow rate which is calculated.

The controller may be further programmed to: detect or estimate the cooler outflow gas temperature; calculate, as a final required circulation flow rate, a value obtained by adding, to the required circulation flow rate, a feedback value for reducing an absolute value of a difference between the cooler outflow gas temperature which is detected or estimated and the target temperature Tgouttrg; and drive the electrically driven water pump so that the circulation flow rate of the cooling water approaches the final required circulation flow rate that is calculated. A feedback gain used for the feedback value may be greater as the circulation flow rate of the cooling water is greater under a same cooler passing-through gas flow rate.

The controller may be further programmed to: detect or estimate the cooler outflow gas temperature; calculate, as a final required circulation flow rate, a value obtained by adding, to the required circulation flow rate, a feedback value for reducing an absolute value of a difference between the cooler outflow gas temperature which is detected or estimated and the target temperature Tgouttrg; and drive the electrically driven water pump so that the circulation flow rate of the cooling water approaches the final required circulation flow rate that is calculated. A feedback gain used for the feedback value may be greater as the cooler passing-through gas flow rate is greater under a same required intercooler cooling efficiency ηreq.

The controller may be further programmed to: detect or estimate the cooler outflow gas temperature; calculate, as a final required circulation flow rate, a value obtained by adding, to the required circulation flow rate, a feedback value for reducing an absolute value of a difference between the cooler outflow gas temperature which is detected or estimated and the target temperature Tgouttrg; and drive the electrically driven water pump so that the circulation flow rate of the cooling water approaches the final required circulation flow rate that is calculated. A feedback gain used for the feedback value may be less as the cooling water temperature Tw is lower under a same circulation flow rate of the cooling water.

The internal combustion engine may further include an exhaust gas recirculation device that includes an exhaust gas recirculation passage which connects an exhaust passage of the internal combustion engine with an intake passage of the internal combustion engine and that is configured to introduce a recirculated exhaust gas into the intake passage through the exhaust gas recirculation passage. Further, the required intercooler cooling efficiency ηreq may be calculated based on the target temperature Tgouttrg determined so that the cooler outflow gas temperature becomes equal to or higher than a predetermined temperature.

According to the control apparatus for an internal combustion engine of the present disclosure, the relation information is used that defines a relation between the required circulation flow rate, and the required intercooler cooling efficiency and the cooler passing-through gas flow rate, and the required circulation flow rate is calculated based on the required intercooler cooling efficiency and the cooler passing-through gas flow rate. This required intercooler cooling efficiency is defined based on the cooler inflow gas temperature, the cooling water temperature and the target temperature of the cooler outflow gas. This calculation method of the required circulation flow rate is therefore not required to include the relation information used for calculation of the required circulation flow rate in such a manner as to change the relation information in accordance with the cooler inflow gas temperature, the cooling water temperature and the aforementioned target temperature. That is to say, in the relation information of the control apparatus, it has only to simply define a relation between the required intercooler cooling efficiency in which changes of these cooler inflow gas temperature, cooling water temperature and target temperature are reflected, the cooler passing-through gas flow rate and the required circulation flow rate. Therefore, according to the control apparatus, the required circulation flow rate can be properly calculated based on the relation information while reducing man hour for creating the relation information.

DETAILED DESCRIPTION

First Embodiment

Figure 1:
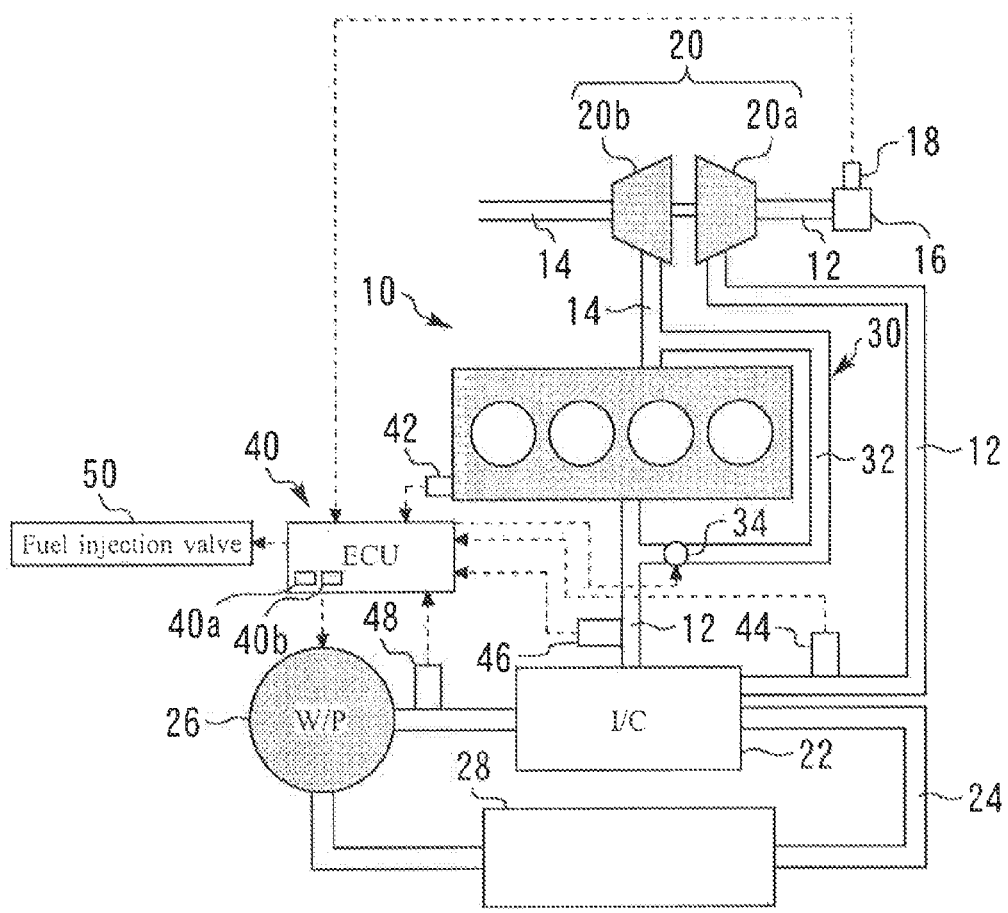
FIG. 1 is a view for describing a system configuration according to a first embodiment of the present disclosure.

Firstly, a first embodiment of the present disclosure will be described with reference to FIG. 1 to FIG. 3.
[System Configuration of First Embodiment]
FIG. 1 is a view for describing a system configuration according to a first embodiment of the present disclosure. The system shown in FIG. 1 includes an internal combustion engine 10. The internal combustion engine 10 is mounted on the vehicle and used as a power source thereof. Although the internal combustion engine 10 is a compression ignition engine as an example, an internal combustion engine that is the object of the present disclosure is not limited to a compression ignition engine and may be a spark ignition engine.

An intake passage 12 and an exhaust passage 14 communicate with each cylinder of the internal combustion engine 10. An air cleaner 16 is provided in the vicinity of an inlet of the intake passage 12. An air flow sensor 18 that outputs a signal that is in accordance with the flow rate of intake air (intake air flow rate) that is taken into the intake passage 12 is attached to the air cleaner 16.

As an example of a supercharger that supercharges intake air, the internal combustion engine 10 is provided with a turbo-supercharger 20 that includes a compressor 20a and a turbine 20b. The compressor 20a is arranged in the intake passage 12 at a location on the downstream side of the air cleaner 16, while the turbine 20b is arranged in the exhaust passage 14. The compressor 20a is rotationally driven with the turbine 20b that operates by exhaust energy of exhaust gas.

In the intake passage 12 at a location on the downstream side of the compressor 20a, an intercooler 22 for cooling the intake gas (in the internal combustion engine 10, intake air) compressed by the compressor 20a is arranged. More specifically, the intercooler 22 is a water-cooled heat exchanger that conducts heat exchange between the intake gas and the cooling water. The internal combustion engine 10 is provided with a cooling water flow circuit 24 through which the cooling water flows. Inside the intercooler 22, an internal passage (not shown in the drawings) through which the cooling water flows is formed. This internal passage is connected to the cooling water flow circuit 24.

Moreover, in the cooling water flow circuit 24, an electrically driven water pump (W/P) 26 is arranged to circulate the cooling water so as to flow through the intercooler 22. In the cooling water flow circuit 24, a radiator 28 configured to conduct heat exchange between the cooling water and the outside air is arranged in order to release heat which the cooling water has received from the intake gas.

The internal combustion engine 10 is provided with an exhaust gas recirculation device (EGR device) 30 configured to recirculate a part of exhaust gas into the intake passage 12. The EGR device 30 includes an EGR passage 32 and an EGR valve 34. The EGR passage 32 is configured to connect the exhaust passage 14 at a location on the upstream side of the turbine 20b with the intake passage 12 at a location on the downstream side of the compressor 20a (in the present embodiment, on the further downstream side of the intercooler 22). That is to say, the EGR device 30 is a so-called high pressure loop (HPL) type EGR device. The EGR valve 34 is configured to adjust the flow rate of EGR gas that flows through the EGR passage 32.

The system shown in FIG. 1 further includes a control apparatus that controls the internal combustion engine 10. The control apparatus includes an electronic control unit (ECU) 40 and drive circuits (not shown in the drawings) for driving various actuators described below. The ECU 40 includes at least an input/output interface, a memory 40a, and a central processing unit (CPU) 40b, and entirely controls the system shown in FIG. 1. The input/output interface is configured to receive sensor signals from various sensors installed in the internal combustion engine 10 or the vehicle on which the internal combustion engine 10 is mounted, and to also output actuating signals to various actuators which the internal combustion engine 10 includes. Various control programs and maps for controlling the internal combustion engine 10 are stored in the memory 40a. The CPU 40b reads out a control program from the memory 40a and executes the control program, and generates actuating signals for various actuators based on the received sensor signals.

The sensors from which the ECU 40 receives signals include, in addition to the aforementioned air flow sensor 18, various sensors for acquiring the engine operational state, such as a crank angle sensor 42 for acquiring the rotational position of a crankshaft and an engine speed, and temperature sensors 44, 46 and 48. The temperature sensor 44 detects a temperature Tgin of the intake gas that flows into the intercooler 22 (hereafter, referred to as a "cooler inflow gas"). The temperature sensor 46 detects a temperature Tgout of the intake gas that flows out from the intercooler 22 (hereafter, referred to as a "cooler outflow gas"). The temperature sensor 48 detects a cooling water temperature Tw in the cooling water circulation circuit 24 (in the present embodiment, the temperature of the cooling water that flows into the intercooler 22 as an example). In addition, the actuators to which the ECU 40 outputs actuating signals include, in addition to the aforementioned W/P 26, various actuators (not shown in the drawings) for controlling engine operation, such as a fuel injection valve 50 for supplying fuel into a cylinder of the internal combustion engine 10.

[Operation According to First Embodiment]
(Outline of Outflow Gas Temperature Control for Intercooler)

According to the system of the present embodiment that includes the aforementioned configuration, intake gas can be cooled using the intercooler 22 by driving the W/P 26. If the W/P 26 is driven under a situation in which introduction of EGR gas is performed using the EGR device 30, the EGR gas is mixed with the intake gas that has been cooled by the intercooler 22 (that is, "cooler outflow gas") at a location of the intake passage 12 on the downstream side of the intercooler 22. If, as a result, the EGR gas is cooled to reach or fall below its dew point, the moisture of the EGR gas condenses and condensed water is produced accordingly. If, on the other hand, the temperature of the intake gas that flows into the cylinders is too high due to insufficient cooling of the intake gas by the intercooler 22, there is a concern that NOx emissions may increase or engine output power may decrease.

Accordingly, control of driving the W/P 26 (that is, flow rate control of cooling water) according to the present embodiment can be performed as the following outflow gas temperature control, in order to be able to properly cool the intake gas while reducing the occurrence of the aforementioned condensed water. This outflow gas temperature control is performed to adjust, with the W/P 26, the circulation flow rate of the cooling water (hereunder, simply referred to as a "cooling water flow rate") Qw so that the cooler outflow gas temperature Tgout approaches a target temperature Tgouttrg. Note that the cooling water flow rate Qw is the volumetric flow rate and may also be simply referred to as a "cooling water flow rate Qw" hereunder.

The required circulation flow rate Qwreq for causing the cooler outflow gas temperature Tgout to approach the target temperature Tgouttrg differs depending on the operational state of the internal combustion engine 10, for example. It is therefore conceivable to be equipped with a map (not shown in the drawings) that defines a relation between the required circulation flow rate Qwreq, and the engine load and engine speed, and to adopt a configuration in which the required circulation flow rate Qwreq is calculated in accordance with the engine load and the engine speed based on this kind of map. However, in order to properly determine the required circulation flow rate Qwreq based on the engine load and the engine speed, it is required to be equipped with the aforementioned map as a plurality of maps that differ depending on the state of the outside air (such as the temperature and pressure of the outside air). This is because, when the state of outside gas changes, the target temperature Tgouttrg, the cooling water temperature Tw, the cooler inflow gas temperature Tgin and a flow rate G per unit time of the intake gas that passes through the intercooler 22 (this is the mass flow rate and is referred to as a "cooler passing-through gas flow rate G") vary. Accordingly, there is a concern that a lot of man hour for creating the aforementioned map may be required.

(Characteristic Operation in First Embodiment)

Figure 2:
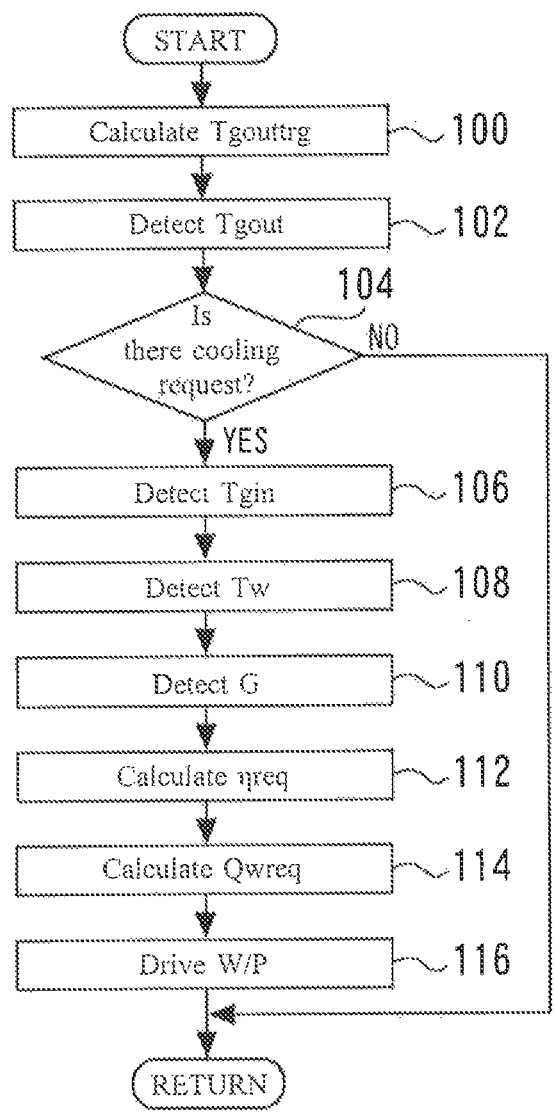
FIG. 2 shows a flowchart that represents a routine executed when outflow gas temperature control according to the first embodiment of the present disclosure is performed.

Taking into consideration an issue described above, in the present embodiment, the required circulation flow rate Qwreq is calculated in accordance with the processing of the following routine shown in FIG. 2. On that basis, the W/P 26 is driven so as to cause the circulation flow rate to approach a calculated required circulation flow rate Qwreq.

FIG. 2 shows a flowchart that represents a routine executed by the ECU 40 when the outflow gas temperature control according to the first embodiment of the present disclosure is performed. Note that, the present routine is started up in response to the startup of the internal combustion engine 10 and is repeatedly executed for each predetermined control period during operation of the internal combustion engine 10.

According to the routine shown in FIG. 2, first, the ECU 40 calculates a target temperature Tgouttrg of the cooler outflow gas (step S100). The target temperature Tgouttrg is calculated as a temperature at which, even if the EGR gas is introduced, the condensed water is not produced. More specifically, the target temperature Tatouttrg is set as a minimum temperature Tgout1 that is required so that, when the intake gas (that is, intake air with the cooler outflow gas temperature Tgout) is mixed with the EGR gas at a location on the downstream side of the intercooler 22, the temperature of the EGR gas does not reach or fall below its dew point. In addition, since the target temperature Tgouttrg has only to prevent the temperature of the EGR gas that has been mixed with the intake air from reaching or falling below its dew point, the target temperature Tgouttrg itself may be lower than the dew point of the aforementioned EGR gas. Note that the target temperature Tgouttrg may be higher than this temperature Tgout1 by a predetermined temperature difference. The temperature of the EGR gas varies in response to a change of the operational state of the internal combustion engine 10 (as an example, the engine speed and the engine load (fuel injection amount)). It is therefore favorable that the target temperature Tgouttrg be a value according to the operational state. A map (not shown in the drawings) that defines a relation between the operational state and the target temperature Tgouttrg is stored in the ECU 40 accordingly. In this step S100, the target temperature Tgouttrg according to the operational state is calculated with reference to this kind of map.

Next, the ECU 40 detects a cooler outflow gas temperature Tgout with the temperature sensor 46 (step S102). Next, the ECU 40 determines whether or not there is a cooling request of the intake gas (step S104). The presence or absence of the cooling request can be determined with the following method, for example. More specifically, if the cooler outflow gas temperature Tgout detected in step S102 is higher than a first predetermined value (as an example, the target temperature Tgouttrg calculated in step S100), it is determined that there is a cooling request. If, on the other hand, the cooler outflow gas temperature Tgout is smaller than a second predetermined value (a value that is smaller than the first predetermined value by a predetermined amount), it is determined that there is no cooling request. According to this method, it is determined that there is a cooling request when the cooler outflow gas temperature Tgout exceeds the first predetermined value (target temperature Tgouttrg) as a result of an increase of the cooler inflow gas temperature Tgin after startup of the internal combustion engine 10. The determination that there is a cooling request is continued thereafter, provided that the cooler outflow gas temperature Tgout does not fall below the second predetermined value. Where the cooler inflow gas temperature Tgin has fallen below the second predetermined value (for example, where idling operation is performed long), it is determined that there is no cooling request.

If the ECU 40 determines in step S104 that there is no cooling request, the ECU 40 promptly ends the current processing cycle of this routine. If, on the other hand, the ECU 40 determines that there is a cooling request, the ECU 40 next detects a cooler inflow gas temperature Tgin with the temperature sensor 44 (step S106), and detects a cooling water temperature Tw with the temperature sensor 48 (step S108). Further, the ECU 40 detects a cooler passing-through gas flow rate G with the air flow sensor 18 (step S110).

Next, the ECU 40 calculates a required I/C cooling efficiency $\eta$req that is a cooling efficiency required for the intercooler 22 (step S112). Here, FIG. 3 is a graph that represents the cooling characteristics of the intercooler 22 with a relation between the cooling water flow rate Qw, and the I/C cooling efficiency and the cooler passing-through gas flow rate G. When the cooing water passes through the intercooler 22, there is a relation as shown in FIG. 3 between the cooling water flow rate Qw, the cooler passing-through gas flow rate G and the cooling efficiency $\eta$ of the intercooler 22 (I/C cooling efficiency $\eta$). More specifically, as shown in FIG. 3, the I/C cooling efficiency $\eta$ becomes higher as the cooling water flow rate Qw is greater, under the same cooler passing-through gas flow rate G. In addition, the I/C cooling efficiency $\eta$ under a cooling water flow rate Qw becomes higher as the cooler passing-through gas flow rate G is less.

As shown in the following formula (1), the I/C cooling efficiency $\eta$ mentioned here is a value that is obtained by dividing a difference between the cooler inflow gas temperature Tgin and the cooler outflow gas temperature Tgout by a difference between the cooler inflow gas temperature Tgin and the cooling water temperature Tw. Thus, according to this cooling characteristics shown in FIG. 3 and the formula (1), a relation is specified between parameters that forms the I/C cooling efficiency $\eta$ (that is, the cooler inflow gas temperature Tgin, the cooler outflow gas temperature Tgout and the cooling water temperature Tw), and the cooler passing-through gas flow rate G and the cooling water flow rate Qw.

$$\eta = \frac{Tgin - Tgout}{Tgin - Tw} \quad (1)$$

On the other hand, the right side of formula (2) shown below is obtained by substituting the target temperature Tgouttrg into the term of the cooler outflow gas temperature Tgout on the right side of the formula (1). This value of the right side thus corresponds to an I/C cooling efficiency $\eta$ that is obtained when the cooler outflow gas temperature Tgout is a target temperature Tgouttrg. In the present embodiment, the I/C cooling efficiency $\eta$ calculated like this is treated as the required I/C cooling efficiency $\eta$req. In this step S112, the required I/C cooling efficiency $\eta$req is calculated as a value that is obtained by substituting, into the formula (2), the values target temperature Tgouttrg, cooler inflow gas temperature Tgin and cooling water temperature Tw obtained by the processing in steps S100, S106 and S108, respectively.

$$\eta req = \frac{Tgin - Tgouttrg}{Tgin - Tw} \quad (2)$$

Next, the ECU 40 calculates the required circulation flow rate Qwreq (step S114). As shown in FIG. 3, there is a correlation between the I/C cooling efficiency $\eta$, the cooler passing-through gas flow rate G and the cooling water flow rate Qw. Therefore, the cooling water flow rate Qw corresponding to the required circulation flow rate Qwreq on each characteristic lines shown in FIG. 3 corresponds to a value that is necessary to achieve a target temperature Tgouttrg under the cooler inflow gas temperature Tgin and cooling water temperature Tw that serve as a basis for calculation of the required I/C cooling efficiency ηreq, that is, the required circulation flow rate Qwreq. In addition, if the cooler passing-through gas flow rate G is specified, the required circulation flow rate Qwreq corresponding to the required I/C cooling efficiency ηreq is uniquely determined based on the relation shown in FIG. 3.

Figure 3:
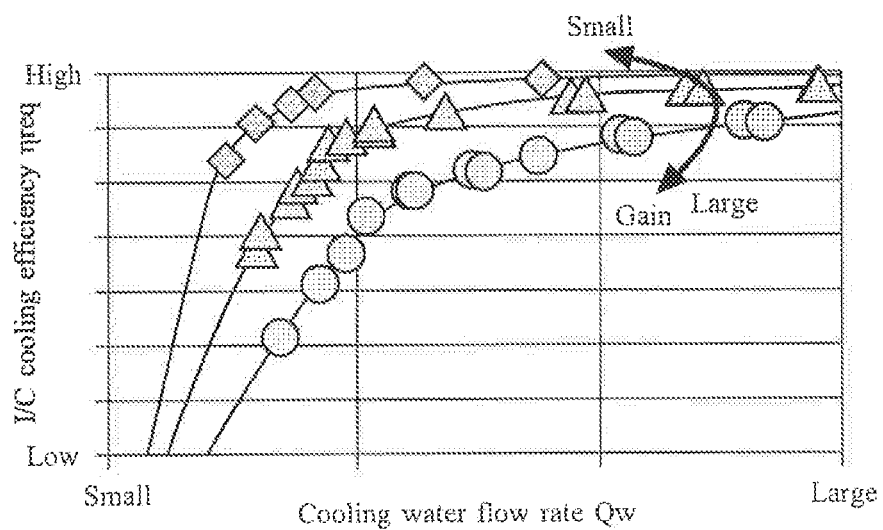
FIG. 3 is a graph that represents the cooling characteristics of an intercooler with a relation between a cooling water flow rate Qw, and a required I/C cooling efficiency ηreq and a cooler passing-through gas flow rate G.

Based on the above facts, one map (hereunder, referred to as a "map M" for convenience and not shown in the drawings) that defines, using the same characteristics as the cooling characteristics as shown in FIG. 3, a relation between the required circulation flow rate Qwreq, and the required I/C cooling efficiency ηreq and cooler passing-through gas flow rate G is stored in the ECU 40. More specifically, in the map M, a relation in which the required circulation flow rate Qwreq becomes greater as the required I/C cooling efficiency ηreq is higher and in which the required circulation flow rate Qwreq becomes greater as the cooler passing-through gas flow rate G is greater is defined as with the cooling characteristics as shown in FIG. 3. In this step S114, the ECU 40 calculates the required circulation flow rate Qwreq corresponding to the required I/C cooling efficiency ηreq and the cooler passing-through gas flow rate G that are obtained in steps S112 and S110, respectively, based on this kind of map M.

Next, the ECU 40 executes the driving of the W/P 26 (step S116). More specifically, the electric power for driving the W/P 26 is controlled so as to cause the cooling water flow rate Qw to approach the required circulation flow rate Qwreq. This kind of control of the electric power for driving the W/P 26 can be performed, for example, by changing the duty ratio of the voltage that is applied to an electric motor (not shown in the drawings) of the W/P 26. To be more specific, the duty ratio of the voltage is made higher as the required circulation flow rate Qwreq is greater.

According to the processing of the routine shown in FIG. 2 described so far, the required circulation flow rate Qwreq is calculated in accordance with the map M as a value based on the required IC cooling efficiency ηreq and the cooler passing-through gas flow rate G. The required circulation flow rate Qwrcq is defined using, as parameters, the cooler inflow gas temperature Tgin, the cooling water temperature Tw and the target temperature Tgouttrg as shown in the formula (2); According to the map M that uses, as one of the axes thereof, the required I/C cooling efficiency ηreq defined like this, the required circulation flow rate Qwreq can be uniquely calculated with one map (that is, without the need of pluralizing the map depending on the cooler inflow gas temperature Tgin, the cooling water temperature Tw and the target temperature Tgouttrg), without depending on the state of the outside air (that is, even if the cooler inflow gas temperature Tgin or the cooling water temperature Tw varies). In addition, even if the target temperature Tgouttrg varies, the required circulation flow rate Qwreq can be calculated with one map. Therefore, according to the method of the present embodiment, the required circulation flow rate Qwreq can be properly calculated while reducing man hour for acquisition of the map.

Moreover, according to the present embodiment, the required I/C cooling efficiency ηreq is calculated based on the target temperature Tgouttrg that is set taking into consideration reducing an occurrence of the condensed water at the connecting part between the intake gas (intake air) at the downstream of the intercooler 22 and the EGR gas. The required circulation flow rate Qwreq can be properly calculated with one map M while implementing countermeasures against the aforementioned condensed water.

Note that, in the above described first embodiment, the map M corresponds to the "relation information" according to the present disclosure; and the temperature Tgout1 corresponds to the "predetermined temperature" according to the present disclosure. In addition, the ECU 40 that is programmed to: execute the processing in step S106; execute the processing in step S108; execute the processing in step S110; execute the processing in step S112; execute the processing in step S114; and execute the processing in step S116, corresponds to the "controller" according to the present disclosure.

Second Embodiment

Next, with reference to FIG. 4 to FIG. 7B, a second embodiment of the present disclosure will be described. In the following explanation, the configuration shown in FIG. 1 is used as an example of the system configuration of the second embodiment.

[Operation According to Second Embodiment]
(Feedback Control Accompanying Outflow Gas Temperature Control)

It can be said that the required circulation flow rate Qwreq that is calculated based on the required I/C cooling efficiency ηreq and the cooler passing-through gas flow rate G in the above described first embodiment corresponds to a feedforward value that is used to cause the cooler outflow gas temperature Tgout to approach the target temperature Tgouttrg. Hereunder, the required circulation flow rate Qwreq is also referred to as a "feedforward value Qwreq". In the outflow gas temperature control of the present embodiment, a value that is obtained by adding the following feedback value Qwfb to the aforementioned feedforward value Qwreq is used as a final required circulation flow rate (hereunder, referred to as a "final required flow rate Qwreqf").

The feedback value Qwfb can be calculated using a feedback gain K and a difference ΔT between the cooler outflow gas temperature Tgout detected by the temperature sensor 46 and the target temperature Tgouttrg thereof; as will hereinafter be described in detail. By using this kind of feedback value Qwfb as well as the feedforward value Qwreq, it becomes possible to more properly address a transitional change of the cooler outflow gas temperature Tgout which cannot be fully addressed with only the feedforward value Qwreq, or a change of environment conditions, such as the temperature in the engine compartment of the vehicle.

(Issue at Time of Performing Feedback Control)

A feedback gain used in feedback control is generally a fixed value. However, in the feedback control of the present embodiment, if a fixed value is simply used as the feedback gain, it becomes difficult to ensure convergence performance of the cooler outflow gas temperature Tgout equivalently in any manner of changes of the operational state of the internal combustion engine 10, due to the following reason. Note that the convergence performance of the cooler outflow gas temperature Tgout mentioned here means the performance of the shortening of the convergence time of the cooler outflow gas temperature Tgout that is taken in the process of convergence of the cooler outflow gas temperature Tgout to the target temperature Tgouttrg by the feedback control, and the performance of suppression of an increase of the amplitude of the cooler outflow gas temperature Tgout with respect to the target temperature Tgouttrg in the aforementioned process.

Concerning the aforementioned reason, if the operational state of the internal combustion engine 10 varies, the state of the cooler inflow gas (that is, the temperature Tgin and the flow rate (=cooler passing-through gas flow rate G)) may vary. Further, if the state of the cooler inflow gas varies, the cooling water flow rate Qw varies because the required circulation flow rate Qwreq varies as described in the first embodiment. Where the feedback gain K is a fixed value, it is difficult to perform the feedback control while properly taking into consideration the influences of changes of the parameters (that is, the cooler inflow gas temperature Tgin, the cooler passing-through gas flow rate G and the cooling water flow rate Qw) on the convergence performance of the cooler outflow gas temperature Tgout.

Figure 4:
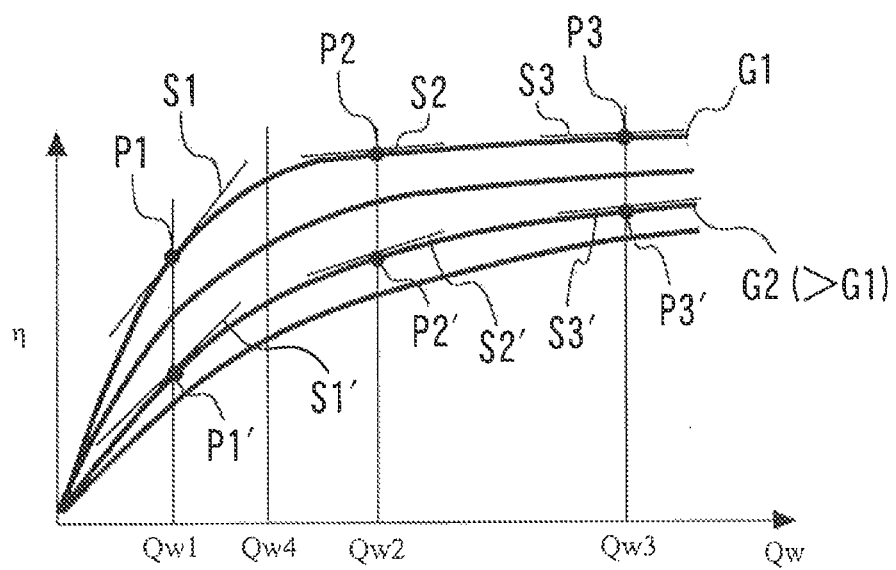
FIG. 4 is a graph that represents the cooling characteristics of the intercooler with a relation between the cooling water flow rate Qw, and the I/C cooling efficiency η and the cooler passing-through gas flow rate G.

FIG. 4 is a graph that represents the cooling characteristics of the intercooler 22 with a relation between the cooling water flow rate Qw, and the I/C cooling efficiency η and the cooler passing-through gas flow rate G, as with FIG. 3. In FIG. 4, P1, P2 and P3 respectively denote points at which the cooling water flow rate Qw are Qw1, Qw2 and Qw3 on a characteristic line of which the cooler passing-through gas flow rate G is a certain value (G1). Similarly, P1', P2' and P3' respectively denote points at which the cooling water flow rate Qw are Qw1, Qw2 and Qw3 on a characteristic line of which the cooler passing-through gas flow rate G is another value (G2). Note that Qw1 is less than Qw2 and Qw2 is less than Qw3, and G1 is less than G2.

In the cooling characteristics shown in FIG. 4, the degree of a change of the I/C cooling efficiency η with respect to a change of the cooling water flow rate Qw (that is, the slope of a tangent line at each point on a characteristic line shown in FIG. 4) is not uniform concerning points on the same characteristic line. More specifically, on the characteristic line in which the cooler passing-through gas flow rate G is GI, the slope of a tangent line S2 that passes through the point P2 is smaller than the slope of a tangent line S1 that passes through the point P on the lower cooling water flow rate Qw side, and the slope of a tangent line S3 that passes through the point P3 is smaller than the slope of the tangent line S2 that passes through the point P2 on the lower cooling water flow rate Qw side. Similarly, on the characteristic line in which the cooler passing-through gas flow rate G is G2, the slope of a tangent line S2' that passes through the point P2' is smaller than the slope of a tangent line S1' that passes through the point P1' on the lower cooling water flow rate Qw side, and the slope of a tangent line S3' that passes through the point P3' is smaller than the slope of the tangent line S2' that passes through the point P2' on the lower cooling water flow rate Qw side. As just described, it can be said that, when seeing the cooling characteristics shown in FIG. 4 from the viewpoint of the cooling water flow rate Qw, the slope of a tangent line of a characteristic line for each cooler passing-through gas flow rate G is smaller as the cooling water flow rate Qw is greater. To be more specific, when seeing the cooling characteristics shown in FIG. 4 from the viewpoint of the cooling water flow rate Qw, the degree of a change of the I/C cooling efficiency η with respect to a certain change of the cooling water flow rate Qw (that is, the slope of a tangent line of a characteristic line in FIG. 4) is relatively large on the lower cooling water flow rate Qw side, and while the degree of a change of the I/C cooling efficiency η with respect to a certain change of the cooling water flow rate Qw (that is, the slope of a tangent line described above) is relatively small on the higher cooling water flow rate Qw side. The reason why the characteristics of the slope like this can be seen is that an increase of the I/C cooling efficiency η as a result of an increase of the cooling water flow rate Qw plateaus in the vicinity of a maximum value of the I/C cooling efficiency η on each characteristic line. In addition, a decrease of the slope due to the reason as described above can be seen on the lower cooling water flow rate Qw side as the cooler passing-through gas flow rate G is less.

Moreover, when seeing the cooling characteristics shown in FIG. 4 from the viewpoint of the cooler passing-through gas flow rate G, the tendency of the magnitude of the slopes of tangent lines of characteristic lines which are difference in the cooler passing-through gas flow rates G from each other differs depending on a range of the cooling water flow rate Qw that is taken as an object. More specifically, when comparing G1 with G2 exemplified in FIG. 4, within a range of the cooling water flow rate Qw that is equal to or less than a certain circulation flow rate Qw4, the slope of the aforementioned tangent line at the same cooling water flow rate Qw is greater at G1 on the lower cooling water flow rate Qw side than at G2 on the higher cooling water flow rate Qw side. In contrast to this, within a range of the cooling water flow rate Qw that is greater than the circulation flow rate Qw4, the slope of the aforementioned tangent line at the same cooling water flow rate Qw is greater at G2 on the higher cooling water flow rate Qw side than at GI on the lower cooling water flow rate Qw side. This relation also establishes between any two cooler passing-through gas flow rate G other than G1 and G2. As just described, between different cooler passing-through gas flow rates G, the tendency of the magnitude of the slopes inverts due to a difference of the range of the cooling water flow rate Qw. On the other hand, it can be said in FIG. 4 that, without depending on a range of the cooling water flow rate Qw, the slope of the tangent line at the same I/C cooling efficiency η is lower as the cooler passing-through gas flow rate G is greater.

According to the above described features of the cooling characteristics shown in FIG. 4, if the cooling water flow rate Qw or cooler passing-through gas flow rate G varies, the slope of a tangent line of a characteristic line shown in FIG. 4 (that is, the degree of a change of the I/C cooling efficiency η with respect to a change of the cooling water flow rate Qw) changes. As a result of this, the amount of change of the cooling water flow rate Qw (that is, the feedback value Qwfb) that is needed to eliminate the aforementioned difference ΔT of the same magnitude differs. Consequently, if a uniform feedback gain K is used without depending on the magnitude of the cooling water flow rate Qw and the cooler passing-through gas flow rate G, it becomes difficult to reduce the aforementioned amplitude of the cooler outflow gas temperature Tgout equivalently when the cooling water flow rate Qw or the cooler passing-through gas flow rate G varies in various flow rate ranges. In addition, if the feedback gain K is not properly determined depending on a manner of a change of the operational state of the internal combustion engine 10, a feedback value per unit time (that is, correction amount of the cooling water flow rate Qw) may be increased or decreased excessively. Therefore, it becomes difficult to ensure the stability of a behavior of the cooler outflow gas temperature Tgout, and to reduce the convergence time of the cooler outflow gas temperature Tgout equivalently without depending on a manner of a change of the operational state of the internal combustion engine 10.

(Method of Characteristic Weighting with Respect to Feedback Gain K)

Taking into consideration the issue described above, in the present embodiment, a weighting with respect to the feedback gain K is performed with the following method. More specifically, the feedback gain K is calculated as a product of a base gain Kbase that is a fixed value and a weighting coefficient Kwt that is variable as follows.

Figure 5A:
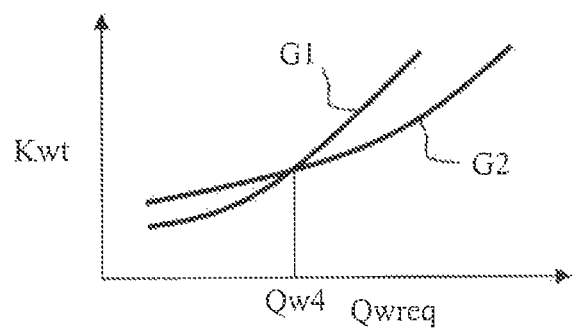
FIG. 5A and FIG. 5B are graphs that represent examples of the setting of a weighting coefficient Kwt.
Figure 5B:
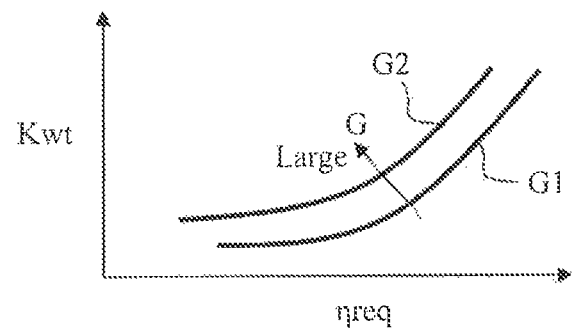

FIG. 5A and FIG. 5B are graphs that represent examples of setting of the weighting coefficient Kwt. FIG. 5A shows the setting of the weighting coefficient Kwt in the viewpoint of the cooling water flow rate Qw while exemplifying the cooler passing-through gas flow rates G1 and G2. As already described, when seeing the cooling characteristics shown in FIG. 4 from the viewpoint of the cooling water flow rate Qw, the slope of a tangent line of a characteristic line for each cooler passing-through gas flow rate G (that is, the degree of a change of the I/C cooling efficiency η with respect to a change of the cooling water flow rate Qw) is smaller as the cooling water flow rate Qw is greater. Accordingly, in the present embodiment, as shown in FIG. 5A, the weighting coefficient Kwt is set taking into consideration the cooling characteristics shown in FIG. 4 so as to be greater as the required circulation flow rate Qwreq is greater under the same cooler passing-through gas flow rate G. According to the setting, when the cooling water flow rate Qw varies, the weighting coefficient Kwt can be set to be less as the degree of a change of the I/C cooling efficiency η with respect to a change of the cooling water flow rate Qw is higher.

FIG. 5B shows the setting of the weighting coefficient Kwt in the viewpoint of the cooler passing-through gas flow rate G while exemplifying the cooler passing-through gas flow rates G1 and G2. As already described, the slope of the tangent line at the same I/C cooling efficiency η is smaller as the cooler passing-through gas flow rate G is greater, without depending on a range of the cooling water flow rate Qw. Accordingly, in the present embodiment, as shown in FIG. 5B, the weighting coefficient Kwt is set taking into consideration the cooling characteristics shown in FIG. 4 so as to be greater as the cooler passing-through gas flow rate G is greater under the same required I/C cooling efficiency ηreq. According to the setting, when the cooler passing-through gas flow rate G varies, the weighting coefficient Kwt can be set to be less as the degree of a change of the I/C cooling efficiency η with respect to a change of the cooling water flow rate Qw is higher.

Figure 6:
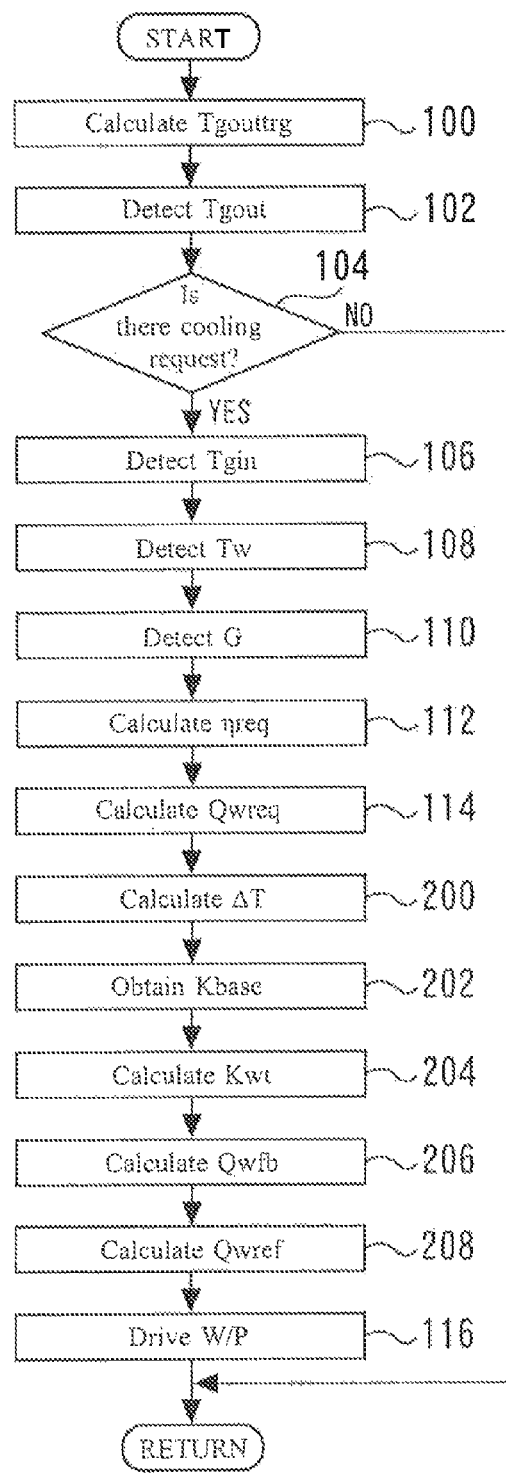
FIG. 6 shows a flowchart that represents a routine executed when outflow gas temperature control according to a second embodiment of the present disclosure is performed.

FIG. 6 shows a flowchart that represents a routine executed by the ECU 40 when the outflow gas temperature control according to the second embodiment of the present disclosure is performed. Note that, in FIG. 6, steps that are the same as steps shown in FIG. 2 in the first embodiment are denoted by the same reference numerals, and a description of those steps is omitted or simplified.

According to the routine shown in FIG. 6, the ECU 40 calculates (the absolute value of) a difference ΔT between the cooler outflow gas temperature Tgout and the target temperature Tgouttrg after calculating the feedforward value (required circulation flow rate) Qwreq in step S114 (step S200).

Next, the ECU 40 obtains a base gain Kbase (step S202). Here, the feedback control that accompanies the outflow gas temperature control performed in the present embodiment is a PID control as an example. Because of this, the feedback value Qwfb can be represented as a sum of a proportional term (P term) Qwfbp, an integral term (I term) Qwfbi and a differential term (D term) Qwfbd as shown in formula (3) shown below. As shown in the formula (3), the proportional term Qwfbp is a product of the aforementioned difference ΔT and a proportional term gain Kp, the integral term Qwfbi is a product of an integrated value of the aforementioned difference ΔT with time and an integral term gain Ki, and the differential term Qwfbd is a product of a differential value of the aforementioned difference ΔT with time and a differential term gain Kd.

$$Qfb = Qfbp + Qfbi + Qfbd \quad (3)$$
$$= Kp \times \Delta T + Ki \times \int \Delta T dt + Kd \times \frac{d\Delta T}{dt}$$

As already described, the feedback gain K used in the present embodiment is a value that is calculated as a produce of the base gain Kbase and the weighting coefficient Kwt. The feedback gains Kp, Ki and Kd for each of the proportional term, integral term and differential term can therefore be represented as a product of the proportional term base gain Kpbase and the weighting coefficient Kwt, a product of the integral term base gain Kibase and the weighting coefficient Kwt, and a product of the differential term base gain Kdbase and the weighting coefficient Kwt as shown in formulas (4) to (6) shown below.

$$Kp = Kpbase \times Kwt \quad (4)$$
$$Ki = Kibase \times Kwt \quad (5)$$
$$Kd = Kdbase \times Kwt \quad (6)$$

The base gains Kpbase, Kibase and Kdbase for each term that are set in advance as fixed values are stored in the ECU 40. In this step S202, the base gains Kpbase, Kibase and Kdbase for each term stored in the ECU 40 are obtained.

Next, the ECU 40 calculates the weighting coefficient Kwt (step S204). A map (not shown in the drawings) that defines a relation between the inverse numbers of the slopes of the respective points (such as P1 to P3 or P1' to P3') on each characteristic line shown in FIG. 4, the required circulation flow rate (feedforward value) Qwreq and the cooler passing-through gas flow rate G is stored in the ECU 40.

In this step S204, the map as described above is referred, and the inverse number of the slope of the aforementioned tangent line (that is, tangent line of the characteristic line at the point P that is identified by the current required circulation flow rate Qwreq and the current cooler passing-through gas flow rate G) that corresponds to the required circulation flow rate (feedforward value) Qwreq calculated in step S114 and the cooler passing-through gas flow rate G detected in step S110 is calculated as the weighting coefficient Kwt. For example, where the current required circulation flow rate Qwreq and the current cooler passing-through gas flow rate G are Qw1 and G1, respectively, the inverse number of the slope S1 on the characteristic line at the point P1 (see FIG. 4) is calculated as the weighting coefficient Kwt for the current processing cycle. The weighting coefficient Kwt that is calculated with this kind of method is greater as the inverse number of the slope is larger.

As already described, according to the cooling characteristics shown in FIG. 4, the slope is smaller as the cooling water flow rate Qw is greater under the same cooler passing-through gas flow rate G. In addition, where the required I/C cooling efficiency ηreq is constant, the slope is smaller as the cooler passing-through gas flow rate G is greater, without depending on a range of the cooling water flow rate Qw. Therefore, according to the processing of this step S204 that calculates the inverse number of the slope as the weighting coefficient Kwt, the weighting coefficient Kwt can be set so as to be greater as the required circulation flow rate (feedforward value) Qwreq is greater under the same cooler passing-through gas flow rate G. Further, where the required I/C cooling efficiency ηreq is constant, the weighting coefficient Kwt can be set so as to be greater as the cooler passing-through gas flow rate G is greater. That is to say, the weighting coefficient Kwt can be set with the tendency shown in FIG. 5A and FIG. 5B. Note that, although an example that refers to a map that uses the required circulation flow rate Qwreq as one of map axes is described here, a map axis for the cooling water flow rate Qw may be the measured value of the cooling water flow rate Qw instead of the required circulation flow rate Qwreq. The weighting coefficient Kwt may thus be calculated based on the measured value of the cooling water flow rate Qw. The measured value of the cooling water flow rate Qw can be obtained, for example, by incorporating a flow rate sensor into the cooling water circulation circuit 24.

Next, the ECU 40 calculates the feedback value Qwfb (step S206). More specifically, firstly, the feedback gains Kp, Ki and Kd of the respective terms are calculated, based on the relations of the aforementioned formulas (4) to (6), using the base gains Kpbase, Kibase and Kdbase of the respective terms obtained in step S202 and the weighting coefficient Kwt calculated in step S204. Then, the feedback value Qwfb is calculated, based on the relation of the aforementioned formula (3), using the calculated feedback gains Kp, Ki and Kd of the respective terms and the difference ΔT calculated in step S200.

Next, the ECU 40 calculates the final required flow rate Qwreqf by adding the feedback value Qwfb calculated in step S206 to the feedforward value Qwreq calculated in step S114 (step S208). In the example of this routine, the driving of the W/P 26 is performed in such a manner as to control the electric power for driving the W/P 26 so that the cooling water flow rate Qw approaches the final required flow rate Qwreqf.

According to the processing of the routine shown in FIG. 6 described so far, a value that is obtained by adding the feedback value Qwfb to the required circulation flow rate (feedforward value) Qwreq calculated as with the first embodiment is used as the final required flow rate Qwreqf. Further, the weighting according to the magnitude of the required circulation flow rate Qwreq and the cooler passing-through gas flow rate G is applied to the feedback gains K (Kp, Ki and Kd) used for calculation of this feedback value Qwfb. More specifically, where the cooler passing-through gas flow rate G is constant, the weighting is applied to the feedback gain K in such a manner that the feedback gain K is greater as the required circulation flow rate (feedforward value) Qwreq is greater. Further, where the required I/C cooling efficiency ηreq is constant, the weighting is applied to the feedback gain K in such a manner that the feedback gain K is greater as the cooler passing-through gas flow rate G is greater.

According to the weighting described above, where at least one of the cooling water flow rate Qw and the cooler passing-through gas flow rate G vary, the feedback gain K can be made smaller as the degree of a change of the I/C cooling efficiency η with respect to a change of the cooling water flow rate Qw is higher. The feedback value Qwfb can therefore be changed properly regardless of a change of the state of the cooler inflow gas (temperature Tgin and flow rate G) in response to a change of the operational state of the internal combustion engine 10, and a change of the cooling water flow rate Qw in response to a change of the state of the cooler inflow gas. More specifically, the aforementioned amplitude of the cooler outflow gas temperature Tgout can be prevented from increasing in response to a change of the cooling water flow rate Qw accompanying a change of the required circulation flow rate Qwreq, or a change of the cooler passing-through gas flow rate G. In addition, an occurrence of excess or deficiency of the feedback vale Qwfb per unit time can be reduced, and as a result, the convergence time of the cooler outflow gas temperature Tgout can be properly controlled without depending on these changes. Based on the above facts, according to the outflow gas temperature control of the present embodiment, the convergence performance of the cooler outflow gas temperature Tgout can be ensured equivalently in any manner of a change of the operational state of the internal combustion engine 10. Hereunder, with reference to FIG. 7A and FIG. 7B, the benefits of the outflow gas temperature control of the present embodiment will be supplementally described by an example.

Figure 7A:
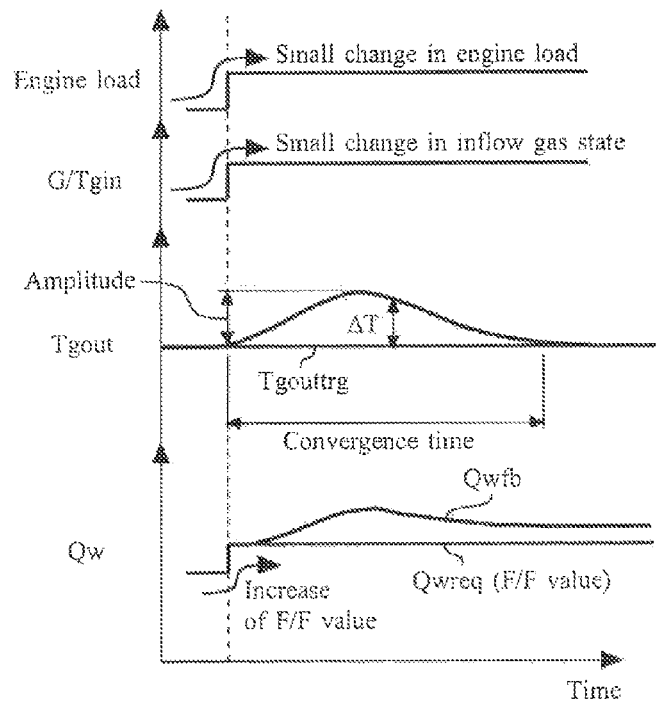
FIG. 7A and FIG. 7B are time charts that represent examples of the operation of the outflow gas temperature control that is accompanied by feedback control performed in accordance with the processing of the routine shown in FIG. 6.
Figure 7B:
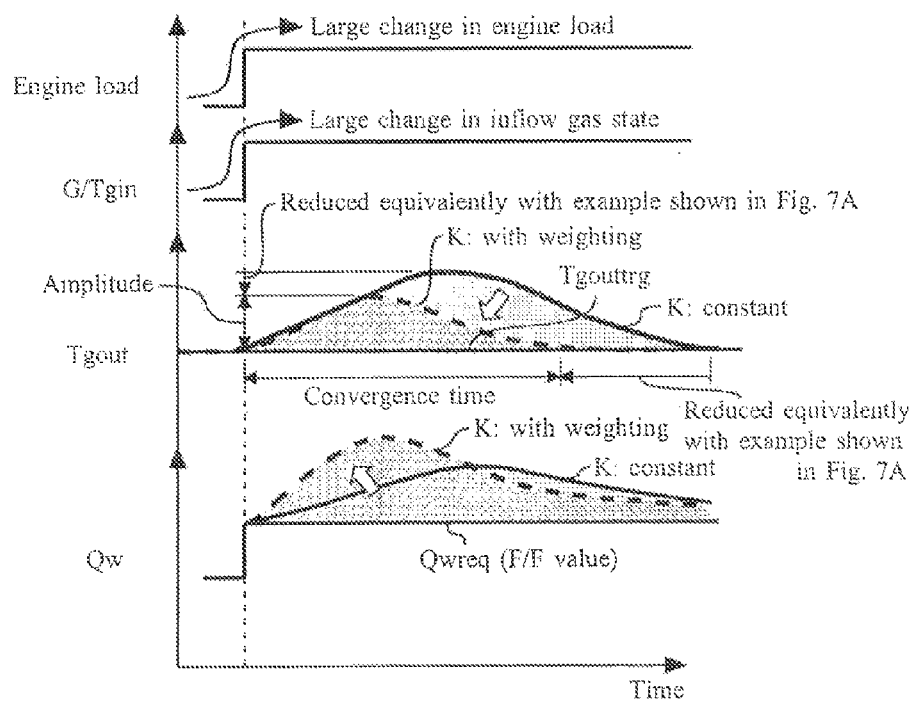

FIG. 7A and FIG. 7B are time charts that represent examples of the operation of the outflow gas temperature control that is accompanied by the feedback control performed in accordance with the processing of the routine shown in FIG. 6. More specifically, FIG. 7A shows an example of the operation where the engine load varies relatively small, and while FIG. 7B shows an example of the operation where the engine load varies relatively large.

Firstly, the example of the operation shown in FIG. 7A is described. FIG. 7A shows a change of the state of the cooler inflow gas (that is, an increase of the temperature Tgin and the flow rate G) that accompanies an increase of the engine load. As a result of the change, the feedforward value (required circulation flow rate) Qwreq becomes greater. A change of the cooler outflow gas temperature Tgout in response to a change of the cooling water flow rate Qw is accompanied by a delay. Because of this, even if the feedforward value Qwreq is increased, the cooler outflow gas temperature Tgout does not converge immediately, and the difference ΔT arises and increases with elapse of time. The feedback value Qwfb is thus started to be added to the feedforward value Qwreq. The feedback value Qwfb goes on increasing with an increase of the difference ΔT in order not to increase the difference ΔT. If the difference ΔT starts to be decreased thereafter as a result of the increases of the feedforward value Qwreq and feedback value Qwfb, the feedback value Qwfb goes on decreasing. Note that the feedback value Qwfb in the example of the operation shown in FIG. 7A includes the integral term Qwfbi. The feedback value Qwfb therefore remains with the magnitude similar to that of the integral term Qwfbi even after the cooler outflow gas temperature Tgout converges with the target temperature Tgouttrg (that is, even after the difference ΔT approaches zero).

In the example of the outflow gas temperature control that is descried with reference to FIG. 7A and FIG. 7B, the feedback gain K (that corresponds to the base gain Kbase of the feedback control of the present embodiment) is adapted as an appropriate value by which a favorable convergence performance of the cooler outflow gas temperature Tgout is obtained in a condition of the example of the operation shown in FIG. 7A. The waveform shown by the solid line in FIG. 7B indicates an example of the operation in which a feedback gain K whose size is the same as that in the example of the operation shown in FIG. 7A is used. It cannot be said that the feedback gain K with an appropriate size for the example of the operation shown in FIG. 7A is sufficient for the example of the operation shown in FIG. 7B in which a change of the engine load is relatively large. Consequently, the cooler outflow gas temperature Tgout largely differs from the target temperature Tgouttrg (that is, the amplitude becomes greater) and it also takes a lot of times with respect to the convergence of the cooler outflow gas temperature Tgout.

In contrast to this, the waveform shown by the broken line in FIG. 7B indicates the example of the operation in which the weighting method of the present embodiment is used for the feedback gain K. In the example of this operation, the cooler inflow gas temperature Tgin and the cooler passing-through gas flow rate G increase more significantly due to an increase of the engine load that is relatively large. Consequently, the feedback gain K is made greater as compared with the example of the operation shown by the solid line in the same drawing because of an increase of the weighting coefficient Kwt due to an increase of the required circulation flow rate Qwreq in response to an increase of the cooler inflow gas temperature Tgin. In addition, the setting of the weighting coefficient Kwt in the above described viewpoint of the cooler passing-through gas flow rate G is also reflected in this feedback gain K.

In the example of the operation shown in the broken line in FIG. 7B, because of the aforementioned increase of the feedback gain K, a feedback value Qwfb with a size that is more sufficient is provided at the initial stage after the engine load varies. Increases of the amplitude of the cooler outflow gas temperature Tgout and the convergence time thereof are therefore reduced equivalently with the example of the operation shown in FIG. 7A.

Note that, in the above described second embodiment, the ECU 40 that is programmed to: execute the processing in steps S200 to S208 as well as the processing in step S114 corresponds to the "controller" according to the present disclosure.

In the above described second embodiment, the weighting coefficient Kwt of the feedback gains Kp, Ki and Kd of the respective terms are set using the inverse number of the slope of a tangent line at each point on the characteristic line shown in FIG. 4. However, the setting method of the feedback gain according to the present disclosure is not limited to the above one, and the feedback gain may be obtained, for example, by way of experiment with a known CHR method. According to the setting method that utilizes the CHR method that is taken here as an example, a process reaction curve of the cooler outflow gas temperature Tgout obtained when the cooling water flow rate Qw is changed in a stepwise fashion is calculated for each predetermined cooler inflow gas temperature Tgin and each predetermined cooler passing-through gas flow rate G. Then, a feedback gain K is determined based on a calculated process reaction curve.

Figure 8A:
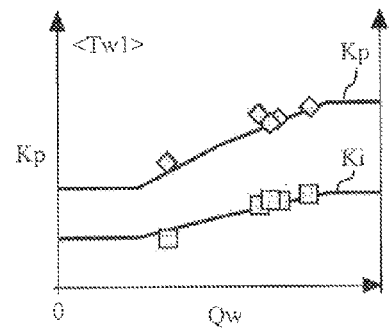
FIG. 8A and FIG. 8B are graphs that represent examples of the setting of a feedback gain K using the CHR method.
Figure 8B:
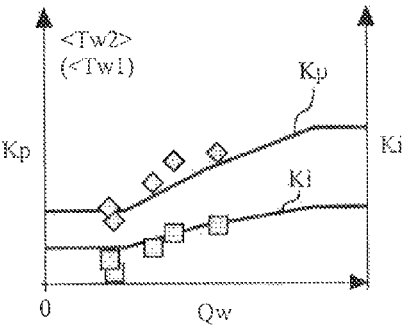

FIG. 8A and FIG. 8B are graphs that represent examples of the setting of the feedback gain K using the CHR method. Note that, although FIG. 8A and FIG. 8B show the examples of the setting of the proportional term gain Kp and the integral term gain Ki, the differential term gain Kd can also be set with the similar way. In addition, FIG. 8A and FIG. 8B show the examples of the setting under the same cooler passing-through gas flow rate G.

FIG. 8A shows the setting of the feedback gains Kp and Ki used when the cooling water temperature Tw is Tw1, and FIG. 8B shows the setting of the feedback gains Kp and Ki used when the cooling water temperature Tw is Tw2 (<Tw1). In any of FIG. 8A and FIG. 8B, the feedback gains Kp and Ki are set so as to be greater as the cooling water flow rate Qw is greater. In addition, as will be understood by comparing FIG. 8A with FIG. 8B, the feedback gains Kp and Ki are smaller at Tw2 on the lower cooling water temperature side than at Tw1 on the higher cooling water temperature side under the same required circulation flow rate Qwreq.

Where the example of the setting shown in FIG. 8A and FIG. 8B, by causing the ECU 40 to store, for each predetermined cooler passing-through gas flow rate G, a map that defines the relations shown in FIG. 8A and FIG. 8B with each horizontal axis of FIG. 8A and FIG. 8B switching to the required circulation flow rate Qwreq, the feedback gains Kp and Ki can be calculated so as to be larger as the required circulation flow rate Qwreq is greater under the same cooler passing-through gas flow rate G. In addition, by setting the aforementioned map so as to be different depending on the cooling water temperature Tw, the feedback gains Kp and Ki can be calculated so as to be smaller as the cooling water temperature Tw is lower under the same required circulation flow rate Qwreq.

In association with the example of the setting shown in FIG. 8A and FIG. 8B, the benefits of setting the feedback gain K so as to be smaller as the cooling water temperature Tw under the same required circulation flow rate Qwreq is lower will be described here. That is, if the feedback gain K is simply a fixed value, there may arise the following issue as well as the issue that has been described in the second embodiment (that is, ensuring the convergence performance of the cooler outflow gas temperature Tgout equivalently without depending on a manner of a change of the operational state of the internal combustion engine 10).

If the outside air temperature varies, the temperature environment in the engine compartment varies. Further, this change of the outside air temperature affects the cooling water temperature Tw. To be more specific, if the outside air temperature lowers, the cooling water temperature Tw lowers. If the cooling water temperature Tw lowers, the viscosity of the cooling water becomes higher and the convection of the cooling water which is circulating weakens. When the convection of the cooling water weakens, the heat exchange between the intake gas and the cooling water in the intercooler 22 is inhibited and as a result, the change rate of the cooler outflow gas temperature Tgout becomes slower (that is, the time constant increases). Based on the foregoing facts, if a uniform feedback gain is used without depending on the magnitude of the cooling water temperature Tw (outside air temperature), there is a concern that the feedback value per unit time may be set with excess or deficiency. As a result, reducing the convergence time of the cooler outflow gas temperature Tgout equivalently without depending on the cooling water temperature Tw may become difficult. With respect to this kind of issue, according to the setting of the feedback gain K shown in FIG. 8A and FIG. 8B, the feedback gain K can be set to be smaller as the cooling water temperature Tw is lower under the same required circulation flow rate Qwreq. The required circulation flow rate Qwreq can therefore not be corrected in accordance with an unnecessary large feedback value Qwfb under a low cooling water temperature Tw (low outside air temperature) at which the time constant of a change of the cooler outflow gas temperature Tgout is larger. Because of this, the hunting of the cooler outflow gas temperature Tgout with respect to the target temperature Tgouttrg can be suppressed. Accordingly, the convergence performance of the cooler outflow gas temperature Tgout can be reduced equivalently without depending on the cooling water temperature Tw. Note that, although the setting of the feedback gain K according to the cooling water temperature Tw under the same required circulation flow rate Qwreq is described here, the feedback gain K may be set, using the measured value of the cooling water flow rate Qw, to be smaller as the cooling water temperature Tw is lower under the same measured value of the cooling water flow rate Qw.

Further, in the second embodiment, the example has been described in which the feedback gain K is caused to vary in the viewpoints of the required circulation flow rate Qwreq and the cooler passing-through gas flow rate G. In addition, in the examples of the settings shown in FIG. 8A and FIG. 8B, the feedback gain K is caused to vary in the viewpoints of the required circulation flow rate Qwreq and the cooling water temperature Tw. However, instead of this manner of the setting, the setting of the feedback gain according to the present disclosure may be based on any one or a plurality of three viewpoints (that is, viewpoints of the cooling water flow rate Qw (required circulation flow rate Qwreq, or measured value of cooling water flow rate Qw), the cooler passing-through gas flow rate G and the cooling water temperature Tw).

Moreover, in the second embodiment, the example of using the PID control as the feedback control has been described. However, a feedback value according to the present disclosure is not limited to the one calculated using all of the proportional term, integral term and differential term as described above, and it has only to be calculated using at least one of these terms.

Moreover, in the first and second embodiments, the outflow gas temperature control has been described by taking as an example the internal combustion engine 10 that includes the EGR device 30 of HPL type. However, an exhaust gas recirculation device that an internal combustion engine that is addressed to the control according to the present disclosure includes is not limited to the one of HPL type, and may be an EGR device of low-pressure loop (LPL) type as with an EGR device 62 that the following internal combustion engine 60 shown in FIG. 9 includes. Further, EGR devices of both of HPL type and LPL type may be included.

Figure 9:
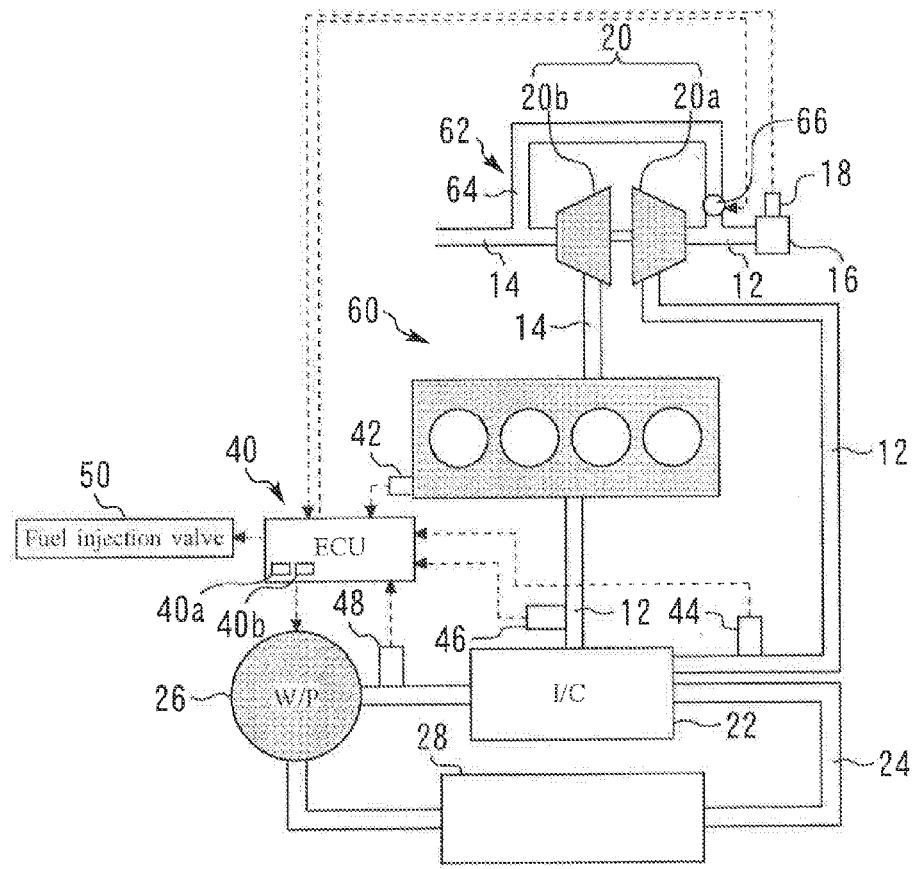
FIG. 9 is a view for explaining an example of a configuration of an internal combustion engine equipped with an EGR device of LPL type.

FIG. 9 is a view for explaining an example of a configuration of the internal combustion engine 60 equipped with the EGR device 62 of LPL type. Note that, in FIG. 9, elements that are the same as constituent elements illustrated in the above described FIG. 1 are denoted by the same reference symbols, and a description of those elements is omitted or simplified hereunder. The internal combustion engine 60 shown in FIG. 9 is different from the internal combustion engine 10 in that the EGR device 62 of LPL type is included instead of the EGR device 30 of HPL type. The EGR device 62 is provided with an EGR passage 64 that connects the exhaust passage 14 on the downstream side of the turbine 20b with the intake passage 12 on the upstream side of the compressor 20a, and an EGR valve 66 arranged in the EGR passage 64.

In the internal combustion engine 60 having the configuration shown in FIG. 9, unlike the internal combustion engine 10, EGR gas is included in the intake gas that flows into the intercooler 22. A target temperature Tgouttrg for reducing the occurrence of condensed water as a result of cooling of the intake gas at the intercooler 22 is therefore required to have a different setting from that used in the internal combustion engine 10. More specifically, in order not to produce the condensed water when the intake gas (that is, mixed gas of intake air and EGR gas) is cooled in the intercooler 22, the target temperature Tgouttrg may be set so that the cooler outflow gas temperature Tgout reaches the dew point of the mixed gas or a temperature that is higher than the dew point by a predetermined temperature difference (these corresponds to the "predetermined temperature"). In addition, in the example of this internal combustion engine 60, the cooler passing-through gas flow rate G that is used for calculation of the required I/C cooling efficiency ηreq is a sum of the flow rate Ga of the intake air that flows into the intercooler 22 and the flow rate GegrL of the EGR gas that flows into the intercooler 22. The intake air flow rate Ga can be detected, for example, with the air flow sensor 18 as with the cooler passing-through gas flow rate G in the first and second embodiments. The EGR gas flow rate GegrL may be calculated, for example, using a map that defines a relation between the EGR gas flow rate GegrL, and the engine speed and engine load (fuel injection amount). Alternatively, the EGR gas flow rate GegrL may be calculated as a value that is based on the opening degree of the EGR valve 66 and a detection value of a differential pressure sensor for detecting the differential pressure before and after the EGR valve 66.

Moreover, an internal combustion engine that is addressed to the present disclosure is not necessarily limited to the one that includes an EGR device, and may be, for example, an internal combustion engine which does not include an EGR device and in which the target temperature Tgouttrg is set in a viewpoint other than that of the aforementioned countermeasures against the condensed water. On that basis, the target temperature of the cooler outflow gas according to the present disclosure is not limited to the one in which the cooler outflow gas temperature is determined so as to reach a predetermined temperature or more from a viewpoint of; for example, the countermeasures against the condensed water, and conversely, may be determined so that the cooler outflow gas temperature reaches a predetermined temperature or lower.

Moreover, as an example of other internal combustion engines that are an object of the present disclosure, an internal combustion engine can be taken in which a heat exchanger for conducting heat exchange between intake gas and engine cooling water is provided in an intake passage at a location between a compressor of a supercharger (for example, a turbo-supercharger) and an intercooler. More specifically, this internal combustion engine uses the intercooler to conduct the main cooling of the intake gas that passes through the compressor, after cooling the intake gas using the aforementioned heat exchanger to some extent. If the required I/C cooling efficiency ηreq is calculated in this internal combustion engine, the temperature of the intake gas after passing through the aforementioned heat exchanger may be used as the cooler inflow gas temperature Tgin.

Moreover, in the first and second embodiments, a configuration of using the map M as an example of the "relation information" according to the present disclosure has been described. However, the "relation information" according to the present disclosure is not necessarily limited to the one stored in a control apparatus as a map, and may be, for example, a relational formula that defines a relation between the required circulation flow rate Qwreq, and the required I/C cooling efficiency ηreq and cooler passing-through gas flow rate G.

Moreover, in the first and second embodiments, an example of detecting the cooler inflow gas temperature Tgin, cooling water temperature Tw, cooler passing-through gas flow rate G and cooler outflow gas temperature Tgout using the temperature sensor 44, temperature sensor 48, air flow sensor 18 and temperature sensor 46, respectively, has been described. However, the acquisition of these temperature and flow rate according to the present disclosure is not limited to the one directly performed using a sensor, and may be performed using any kind of estimation method.

More specifically, first, the cooler inflow gas temperature Tgin may be estimated, for example, based on the engine speed and the engine load (fuel injection amount), or based on the engine speed and the supercharging pressure.

Next, explanation is made for the cooling water temperature Tw. The cooling water temperature Tw during operation of the internal combustion engine 10 or 60 is controlled to a temperature corresponding to the outside air temperature with the radiator 28. Accordingly, an outside air temperature sensor or an intake air temperature sensor that detects the temperature of the intake air in the intake passage 12 on the upstream side of the compressor 20a (for example, the temperature of the intake air in the air cleaner 16) may be included instead of the temperature sensor 48. On that basis, a detection value of the outside air sensor (that is, the outside air temperature) or a detection value of the aforementioned intake air temperature sensor (that is, a temperature corresponding to the outside air temperature) may be used as an estimation value of the cooling water temperature Tw instead of the detection value of the temperature sensor 48. In other words, the outside air temperature or the value corresponding to the outside air temperature may be substituted into the term of the cooling water temperature Tw on the right side of the aforementioned formula (2). Further, the cooling water temperature Tw may be estimated, for example, based on the outside air temperature and the speed of the vehicle on which the internal combustion engine 10 is mounted, or based on the temperature of the intake air at the air cleaner 16 and the speed of the vehicle.

Next, the cooler passing-through gas flow rate G may be estimated, for example, based on the engine speed and the engine load (for example, fuel injection amount), or based on the engine speed and the supercharging pressure.

Moreover, the cooler outflow gas temperature Tgout can be calculated, for example, using the estimation method that uses the following formulas (7) to (10).

$$(Ga+GegrH+GegrL) \times Tb = (Ga+GegrL) \times Tgout + GegrH \times Tegr \quad (7)$$

$$Ga+GegrH+GegrL = Pb \times dV/R/Tb \quad (8)$$

$$dV = \eta vb \times M \quad (9)$$

$$M = Ve \times Ne/n \quad (10)$$

Where, in each formula described above, Ga denotes the flow rate (mass flow rate) of the intake air that passes through an intercooler, and can be detected by an air flow sensor, for example. Tb and Pb respectively denote the temperature and pressure of the gas in an intake passage (intake manifold) on the downstream side of a connecting part between an EGR passage and the intake passage in a configuration that includes an EGR device of HPL type, and the both can be detected, for example, by a sensor. R denotes a known gas constant. GegrH and Tegr denote the flow rate (mass flow rate) and temperature of EGR gas in the HPL type, respectively. GegrL denotes the flow rate (mass flow rate) of EGR gas in the LPL type. GegrH, Tegr and GegrL can be calculated, for example, with reference to a map based on the engine speed and the engine load (fuel injection amount). In an example of the LPL type or an example without including an EGR device, the intake manifold gas temperature Tb is equivalent to the cooler outflow gas temperature Tgout. $\eta vb$ denotes the volumetric efficiency of the intake gas, and can be calculated with reference to a map based on the engine speed. M denotes an amount of scavenging (volumetric flow rate) per unit time, and can be calculated in accordance with the formula (10) described above. dV denotes an amount of volume change, and can be calculated in accordance with the formula (9). In the formula (10), Ve denotes the displacement of an internal combustion engine (that is, a known value). Ne denotes the engine speed, and can be calculated, for example, with a crank angle sensor. "n" denotes a coefficient depending on a type of the internal combustion engine, and is, for example, two in an example of a four-stroke engine.

The aforementioned estimation method differs as follows depending on whether or not an EGR device is included and whether an EGR device that the internal combustion engine include is the LPL type, HPL type or both of the LPL type and HPL type. First, in an example of an internal combustion engine of the HPL type or an example of an internal combustion engine that are both of the LPL type and HPL type, the cooler outflow gas temperature Tgout can be calculated by solving the above referenced simultaneous equations (7) and (8) that take Tgout and Tb as unknown variables. Note that, in the HPL type, the term of GegrL is zero.

Furthermore, in an example of an internal combustion engine of the LPL type or an example of an internal combustion engine that does not include an EGR device, Tb has only to be calculated as the cooler outflow gas temperature Tgout using the formula (8) described above. However, in an example of an internal combustion engine that includes only the LPL type, the terms of GegrH and Tegr are zero, and in an example of an internal combustion engine that does not include an EGR device, the terms of GegrH, Tegr and GegrL are zero.

What is claimed is:

1. A control apparatus for controlling an internal combustion engine, the internal combustion engine including:
    a cooling water flow circuit through which cooling water for cooling an intake gas of the internal combustion engine flows;
    an intercooler arranged in the cooling water flow circuit and configured to conduct heat exchange between the intake gas and the cooling water; and
    an electrically driven water pump arranged in the cooling water flow circuit and configured to circulate the cooling water so as to flow through the intercooler,
    the control apparatus comprising a controller, the controller being programmed to:
    (a) detect or estimate a cooler inflow gas temperature Tgin that is a temperature of the intake gas that flows into the intercooler;
    (b) detect or estimate a cooling water temperature Tw of the cooling water;
    (c) detect or estimate a cooler passing-through gas flow rate that is a flow rate of the intake gas that passes through the intercooler; and
    (d) calculate a required intercooler cooling efficiency $\eta req$ that is defined by a following formula (i):

$$\eta req = \frac{Tgin - Tgouttrg}{Tgin - Tw} \quad (i)$$

where, in the formula (i), Tgouttrg denotes a target temperature of a cooler outflow gas temperature that is a temperature of the intake gas that flows out from the intercooler,
    wherein the controller is further programmed to:
    (e) calculate, with a relation information that defines a relation between the required intercooler cooling efficiency $\eta req$, the cooler passing-through gas flow rate, and a required circulation flow rate of the cooling water required to cause the cooler outflow gas temperature to approach the target temperature Tgouttrg, the required circulation flow rate based on the required intercooler cooling efficiency ηreq and the cooler passing-through gas flow rate; and (f) drive the electrically driven water pump so that a circulation flow rate of the cooling water approaches the required circulation flow rate which is calculated.

2. The control apparatus according to claim 1, wherein the controller is further programmed to:

(g) detect or estimate the cooler outflow gas temperature;

(h) calculate, as a final required circulation flow rate, a value obtained by adding, to the required circulation flow rate, a feedback value for reducing an absolute value of a difference between the cooler outflow gas temperature which is detected or estimated and the target temperature Tgouttrg; and (i) drive the electrically driven water pump so that the circulation flow rate of the cooling water approaches the final required circulation flow rate that is calculated, and wherein a feedback gain used for the feedback value is greater as the circulation flow rate of the cooling water is greater under a same cooler passing-through gas flow rate.

3. The control apparatus according to claim 1, wherein the controller is further programmed to:

(g) detect or estimate the cooler outflow gas temperature;

(h) calculate, as a final required circulation flow rate, a value obtained by adding, to the required circulation flow rate, a feedback value for reducing an absolute value of a difference between the cooler outflow gas temperature which is detected or estimated and the target temperature Tgouttrg; and (i) drive the electrically driven water pump so that the circulation flow rate of the cooling water approaches the final required circulation flow rate that is calculated, and wherein a feedback gain used for the feedback value is less as the cooling water temperature Tw is lower under a same circulation flow rate of the cooling water.

4. The control apparatus according to claim 1, wherein the internal combustion engine further includes an exhaust gas recirculation device that includes an exhaust gas recirculation passage which connects an exhaust passage of the internal combustion engine with an intake passage of the internal combustion engine and that is configured to introduce a recirculated exhaust gas into the intake passage through the exhaust gas recirculation passage, and wherein the required intercooler cooling efficiency ηreq is calculated based on the target temperature Tgouttrg determined so that the cooler outflow gas temperature becomes equal to or higher than a predetermined temperature.

5. The control apparatus according to claim 1, wherein the controller is further programmed to:

(g) detect or estimate the cooler outflow gas temperature;

(h) calculate, as a final required circulation flow rate, a value obtained by adding, to the required circulation flow rate, a feedback value for reducing an absolute value of a difference between the cooler outflow gas temperature which is detected or estimated and the target temperature Tgouttrg; and (i) drive the electrically driven water pump so that the circulation flow rate of the cooling water approaches the final required circulation flow rate that is calculated, and wherein a feedback gain used for the feedback value is greater as the cooler passing-through gas flow rate is greater under a same required intercooler cooling efficiency ηreq.

* * * * *